United States Patent [19]

Iwasaki

[11] Patent Number: 5,303,608
[45] Date of Patent: Apr. 19, 1994

[54] BICYCLE SPEED CHANGE LEVER ASSEMBLY

[75] Inventor: Yoshihisa Iwasaki, Osaka, Japan

[73] Assignee: Maeda Industries, Ltd., Osaka, Japan

[21] Appl. No.: 46,899

[22] PCT Filed: Mar. 22, 1991

[86] PCT No.: PCT/JP91/00380
§ 371 Date: Nov. 4, 1991
§ 102(e) Date: Nov. 4, 1991

[87] PCT Pub. No.: WO91/14614
PCT Pub. Date: Oct. 3, 1991

Related U.S. Application Data

[63] Continuation of Ser. No. 773,907, Nov. 4, 1991, abandoned.

[30] Foreign Application Priority Data

Mar. 26, 1990 [JP]  Japan ................. 2-31700[U]

[51] Int. Cl.⁵ .................................. F16C 1/10
[52] U.S. Cl. ........................... 74/502.2; 74/489
[58] Field of Search ............ 74/489, 475, 502.2, 74/523

[56] References Cited

U.S. PATENT DOCUMENTS

| | | | |
|---|---|---|---|
| 4,343,201 | 8/1982 | Shimano | 74/475 |
| 4,974,469 | 12/1990 | Romano | 74/502 |
| 4,995,280 | 2/1991 | Tagawa | 74/475 X |
| 5,012,692 | 5/1991 | Nagano | 74/489 X |
| 5,094,120 | 3/1992 | Tagawa | 74/502.2 X |
| 5,178,033 | 1/1993 | Kund | 74/502.2 |
| 5,186,071 | 2/1993 | Iwasaki | 74/502.2 X |
| 5,186,072 | 2/1993 | Nagano | 74/502.2 X |
| 5,191,807 | 3/1993 | Hsu | 74/475 X |
| 5,203,213 | 4/1993 | Nagano | 74/502.2 X |

FOREIGN PATENT DOCUMENTS

| | | |
|---|---|---|
| 2574364 | 6/1986 | France . |
| 2632266 | 12/1989 | France . |
| 2644422 | 9/1990 | France ............... 74/502.2 |
| 59-24621 | 7/1984 | Japan . |
| 62-38878 | 10/1987 | Japan . |
| 1-41678 | 8/1989 | Japan . |
| 9113797 | 9/1991 | World Int. Prop. O. ......... 74/502.2 |

Primary Examiner—Leslie A. Braun
Assistant Examiner—Ryan W. Massey
Attorney, Agent, or Firm—Michael D. Bednarek

[57] ABSTRACT

A bicycle speed change lever assembly which includes a lever shift (9) extending downwardly from a mounting bracket (6a) which is attached adjacent an end grip portion of handlebar (1), and a lever pivotally supported on the lever shaft, the lever including a tubular body (7) rotatably fitted on the lever shaft (9), and a control arm (8) extending radially outward from the tubular body (7). The bracket (6a) has a forward extension (6b) so that the lever shaft (9) is arranged forwardly offset relative to an axis of the handlebar (1), and the lever shaft (9) is inclined to have a tip end deviating from a straight line which passes through a base end (9b) of the lever shaft (9) and is perpendicular to the forward extension (6b). This serves a number of purposes, namely to enable speed change operation while gripping the grip portion (2) of the handlebar (1), to enlarge the pivotal range of the control arm (8) to increase the number of speed stages, and to enable smooth pivotal operation of the control arm (8).

7 Claims, 7 Drawing Sheets

BICYCLE SPEED CHANGE LEVER ASSEMBLY

This application is a continuation of application Ser. No. 07/773,907 filed Nov. 4, 1991, now abandoned.

TECHNICAL FIELD

This invention relates to a bicycle speed change lever assembly. More specifically, the present invention relates to a bicycle speed change lever assembly which is capable of increasing the number of selectable speed stages by expanding the pivotal range of a control arm of the lever assembly and in which the control arm can be pivotally operated safely and smoothly.

BACKGROUND OF THE INVENTION

Conventionally, a bicycle speed change lever assembly is mounted at a portion of the bicycle frame or handlebar. Due to such an arrangement, the rider trying to perform a speed change operation needs to remove one hand from a grip portion of the handlebar while assuming a one-hand riding condition. In addition, when the rider encounters a situation which requires sudden braking or avoidance of a road projection or depression while performing a speed change operation, a certain time after the recognition of such a situation is required before actually bringing the hand to the brake or handlebar. Thus, the conventional arrangement is not considered to provide safety in performing speed change.

To solve the above problem, a speed change lever assembly has been proposed which is mounted close to a grip portion of the handlebar for enabling a speed change operation while grasping the grip portion, as disclosed in Japanese Utility Model Publication 59-24621.

However, the speed change lever assembly disclosed in the above publication has a control arm located above the handlebar, so that the thumb or forefinger grasping the grip portion must be moved to a position above the handlebar. While it is not necessary to remove all fingers from the grip portion, the need to remove the most forcefully gripping thumb or forefinger from the grip portion results in insufficient enhancement of the operability and safety of the lever assembly.

Particularly, with the so-called mountain bicycle designed to run off-road, it is desirable for the rider to use the thumb and forefinger for gripping the handlebar even at the time of performing a speed change in view of the fact that the bicycle must always run on severely rough grounds.

As a solution to this problem, there has been developed a bicycle speed change lever assembly which incorporates a bifurcated pair of operating arm portions located adjacent and under a handlebar grip portion and extending on both sides of the grip portion, as disclosed in Japanese Utility Model Publication No. 62-38878 for example. According to the arrangement of this publication, the rider extends the thumb and forefinger downwardly with the handlebar grip portion held therebetween, and the bifurcated pair of arm portions may be pivoted horizontally by the extended thumb and forefinger. Thus, the thumb and forefinger need not be brought out of gripping engagement with the grip portion at the time of performing a speed change operation, thereby greatly improving the safety.

However, with the speed change lever assembly of the latter publication, it is impossible to provide a large pivotal angle for the operating arm portions. Thus, the lever assembly is problematic in the inability of providing five to eight speed stages which are normally required for sports-type bicycles.

More specifically, with the lever assembly of the latter publication, the bifurcated pair of operating arm portions are located on both sides of the handlebar, and the rider gripping the handlebar extends the thumb and forefinger downwardly to pivot the arm portions within the range defined between the thumb and forefinger. Therefore, the pivotal range for the arm portions is limited by the thumb and forefinger extended from the handlebar. As a result, the pivotal range f or the arm portions becomes small, thus failing to provide a required number of speed stages for a normal sports-type bicycle.

Further, the operating arm portions of the lever assembly disclosed in the latter publication are pivotally supported on a lever shaft which is perpendicularly mounted to the handlebar. Thus, the arm portions are pivoted in a plane which is parallel to the handlebar or grip portion.

However, the thumb and forefinger are different in length and movable range, so that the optimum pivotal path of the operating arm portions for the thumb does not coincide with that for the forefinger. Thus, the operating arm portions, if optimized in pivotal path for one of the thumb and forefinger, cannot be conveniently operated by the other.

Further, the operating arm portions need be relatively long to effectively utilize the movable range of the thumb and forefinger and to increase the pivotal range of the arm portions. However, since the respective arm portions are designed to pivot in the same plane, they interfere with the fingers grasping the grip portion during a speed change operation, thereby hindering the speed change operation. Due to this, the pivotal range of the operating arm portions is additionally limited, which is an obstacle in increasing the number of speed stages.

DISCLOSURE OF THE INVENTION

It is, therefore, an object of the present invention is to provide a bicycle speed change lever assembly incorporating a control arm which can be pivoted in a wide range for increasing the number of speed stages and which can be pivotally operated very smoothly.

Another object of the present invention is to provide a bicycle speed change lever assembly which can be operated safely for performing speed change.

The bicycle speed change lever assembly according to the present invention comprises: a lever shaft extending downwardly from a mounting bracket which is attached adjacent an end grip portion of a handlebar; and a lever pivotally supported on the lever shaft, the lever including a tubular body rotatably fitted on the lever shaft, and a control arm extending radially outward from the tubular body; wherein characterized in that:

the bracket has a forward extension so that the lever shaft is arranged forwardly offset relative to an axis of the handlebar, and the lever shaft is inclined to have a tip end deviating from a straight line which passes through a base end of the lever shaft and is perpendicular to the forward extension.

Other objects, features and advantages of the present invention will become apparent from the preferred embodiments described below with reference to the accompanying drawings.

BRIEF DESCRIPTION OF THE DRAWINGS

FIGS. 1 through 6 show a first embodiment of the present invention, wherein:

FIG. 1 is a plan view showing a speed change lever according to the first embodiment as mounted to the straight handlebar of a so-called mountain bicycle;

FIG. 2 is a view showing the lever assembly of FIG. 1 as seen from behind the bicycle (in the arrow X direction);

FIG. 3 is a side view showing the mounting condition of the lever assembly as seen axially of the handlebar (in the arrow Y direction); and FIGS. 4 to 6 are schematic views illustrating the operation of the lever assembly according to the first embodiment.

BEST MODE FOR CARRYING OUT THE INVENTION

The best mode for carrying out the present invention is specifically described with reference to FIGS. 1 through 7.

A first embodiment of the present invention is shown in FIGS. 1 through 6.

Figure 1:
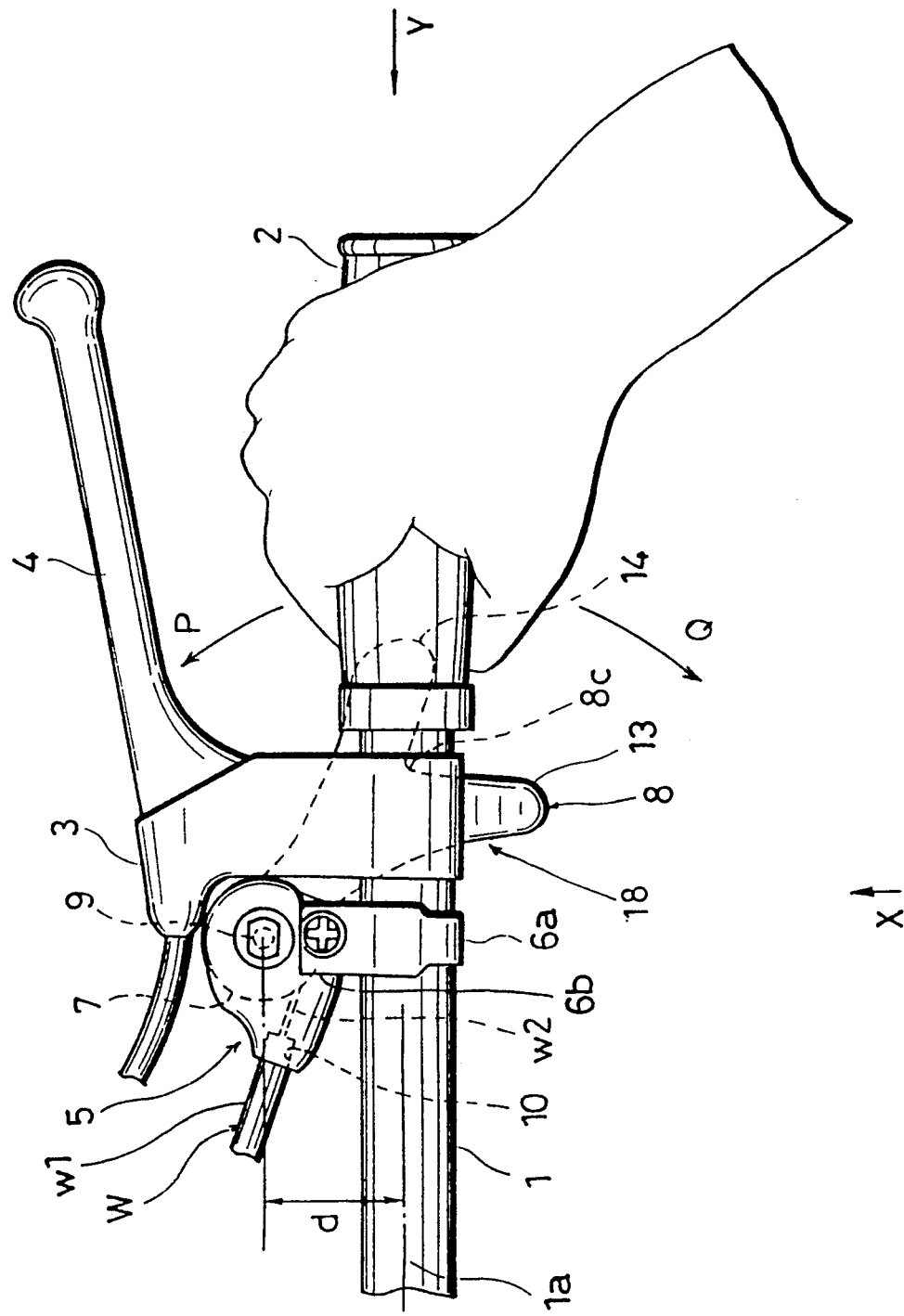
Figure 2:
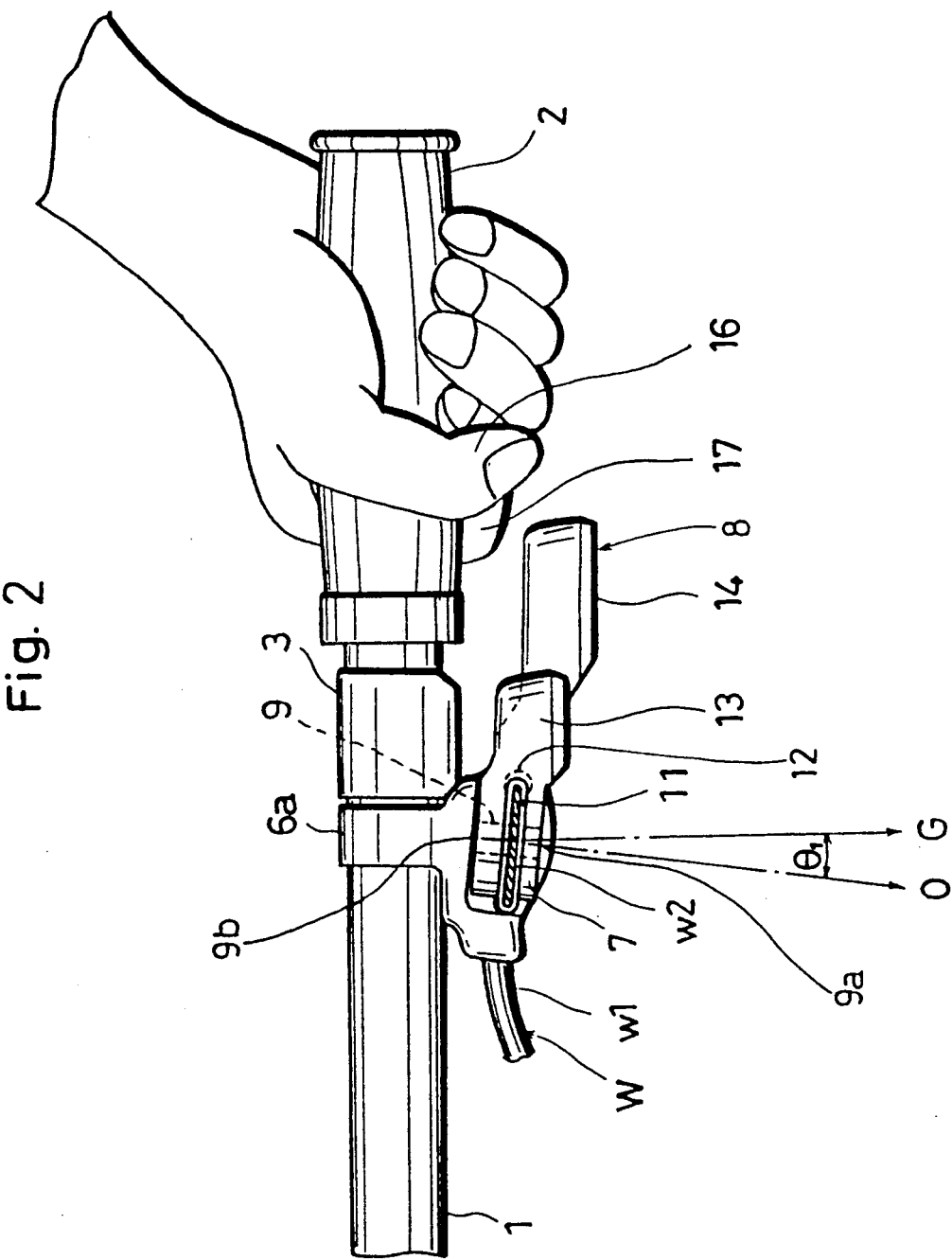

As shown in FIGS. 1 and 2, a handlebar I is provided, at both ends, with grip portions 2 which are coated with soft resin for example. Inwardly relative to each grip portion 2 is arranged a brake bracket 3 projecting forwardly. A brake lever 4 extends ahead of the grip portion 2 and has its base portion pivoted to the brake bracket 3.

Figure 3:
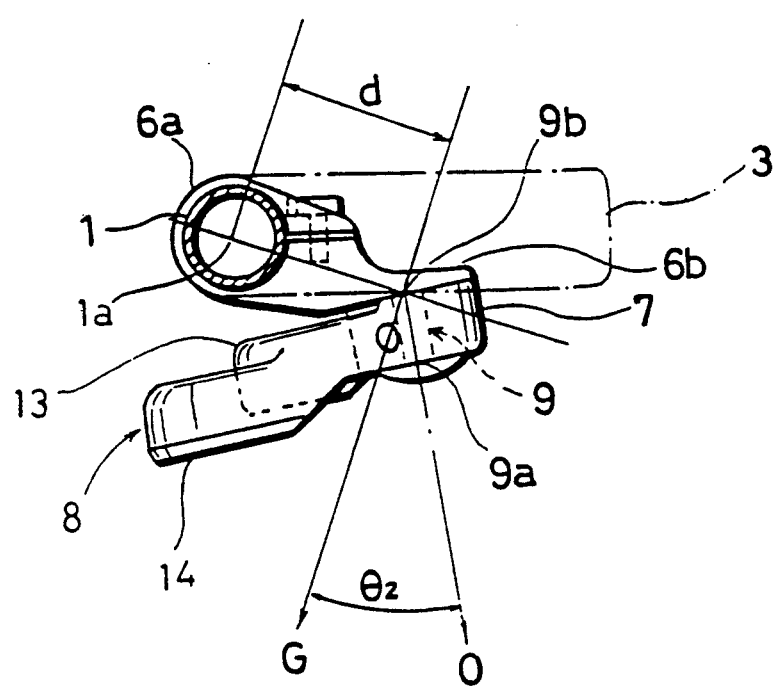

As shown in FIGS. 1 to 3, a speed change lever assembly 5 according to the first embodiment is mounted inwardly and downwardly relative the brake bracket 3. The lever assembly mainly comprises a mounting bracket 6a fitted on the handlebar 1, and a lever 18 which includes a tubular body 7 rotatably supported by the mounting bracket 6a, and a control arm 8 extending radially outward from the tubular body 7. In the first embodiment, the tubular body 7 is rotatably fitted on a lever shaft 9 which is integral with the mounting bracket 6a and extends downward under the handlebar 1. In this way, the lever 18 is pivotally supported by the handlebar 1.

A control cable W extending from an unillustrated derailleur has an outer sheath w1 engaging at its one end with a sheath stopper 10 which is integral with the mounting bracket 6. On the other hand, an inner wire w2 extending through the sheath stopper 10 is wound in a wire groove 11 formed on the outer circumference of the tubular body 7, and has an end nipple 12 caught at a suitable circumferential portion of the tubular body 7. When the control arm 8 is pivotally operated, the end nipple 12 of the inner wire w2 moves rotationally with the tubular body 7, thereby drawing in and paying out the inner wire w2 relative to the outer sheath w1 caught by the sheath stopper 10. Thus, the inner wire w2 is moved axially relative to the outer cable w1, and the unillustrated derailleur is operated by such relative movement of the double cable. According to the first embodiment, when the control arm 8 is pivoted in the direction of an arrow P, the chain is shifted to a lower speed gear. Conversely, when the control arm is pivoted in the direction of an arrow Q, the chain is shifted to a higher speed gear.

As shown in FIG. 1, the control arm 8 according to the first embodiment has a Y-form in plan view by branching into a first operating arm portion 13 and a second operating arm portion 14, and the inner and outer side faces of the respective arm portions are adapted to be manually pushed for operation. Further, the control arm 8 may be pivoted in both directions by engaging either one of the thumb 16 and forefinger 17 with the crotch 8c between the respective arm portions 13, 14.

As better illustrated in FIG. 2, the first arm portion 13 is located inwardly relative to the finger portions engaging the underside of the grip portion 2 and provides a pivotal path immediately under the handlebar 1 or grip portion 2. Thus, the first arm portion may be pivotally operated within a horizontal plane which substantially contains the finger portions engaging the underside of the grip portion 2. On the other hand, the second arm portion 14 is located ahead of the first arm portion 13 and provides a pivotal path which is spaced from the underside of the grip portion 2 by a distance generally corresponding to the thickness of the finger portions engaging the underside of the grip portion, as shown in FIGS. 1 and 2.

The respective pivotal paths of the first and second arm portions 13, 14 differ from each other in the distance from the underside of the handlebar 1 or grip portion 2. Thus, the pivotal pushing position is not fixed relative to the control arm 8, and the control arm 8 can be conveniently pivoted by selecting a suitable operating position depending on the pivotal position and the pivotal direction. As a result, the movable ranges of the thumb 16 and forefinger 17 can be effectively utilized to improve the operability and to increase the pivotal range of the control arm 8.

Further, according to the first embodiment, the mounting bracket 6a is provided with a forward extension 6b, so that the lever shaft 9 for the control arm 8 deviates forwardly by a distance d from the axis 1a of the handlebar 1, as shown in FIGS. 3 to 6.

The deviation of the lever shaft 9 of the control arm 8 forwardly from the handlebar 1 decreases the pivotal range of the control arm 8 behind the handlebar 1 on one hand but increases the pivotal range of the control arm 8 ahead of the handlebar 1. Therefore, it is possible to decrease the moving range of the thumb but increases that of the forefinger, so that the pivotal range of the control arm 8 is defined in corresponding relation to the movable ranges of the thumb and forefinger. As a result, the respective movable ranges of the thumb and forefinger can be effectively utilized to enlarge the movable range of the control arm 8.

Figure 4:
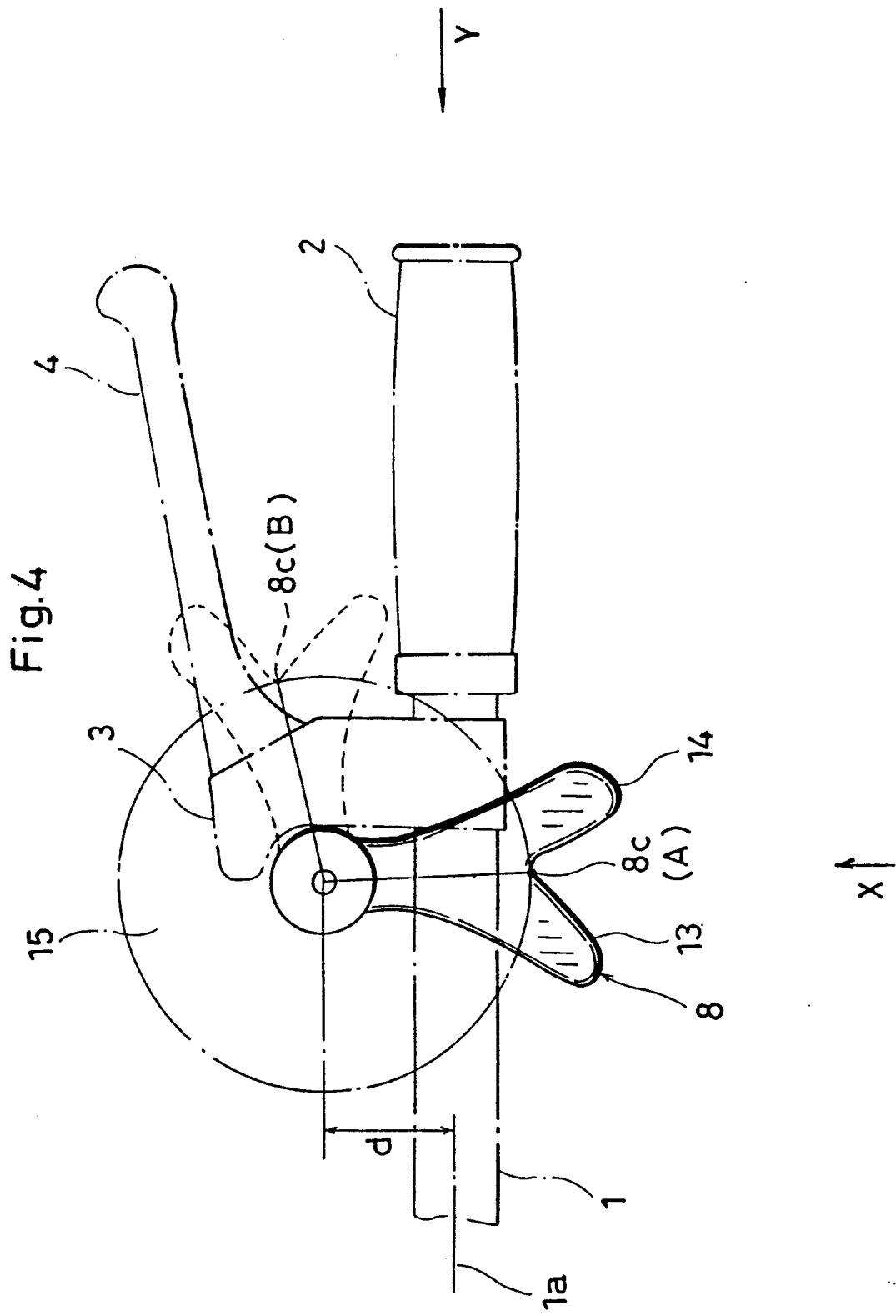

As schematically illustrated in FIG. 4, when the control arm 8 is brought to its rearward pivotal position, the projecting length of the control arm 8 behind the handlebar 1 decreases by the amount d. Therefore, it is unlikely that the free end portion of the control arm 8 is located too far rearwardly from the handlebar 1. Thus, the operability of the control arm 8 by the thumb is greatly improved, so that smooth speed change operation becomes possible.

Further, as shown in FIGS. 2 and 3, according to the second embodiment, the lever shaft 9 of the control arm 8 is inclined so that the tip end 6a of the lever shaft deviates inwardly and forwardly from a straight line G which passes through the base end 9b of the lever shaft 9 and is perpendicular to the forward extension 6b of the mounting bracket 6a. In other words, the lever shaft 9 is inclined (in the direction of an arrow 0) inwardly at an angle $\theta1$ and forwardly at an angle $\theta2$ relative to the straight line G. Due to such inclination of the lever shaft 9, the control arm 8 pivots in a plane which is inclined forwardly upward relative to the forward extension 6b.

Figure 5:
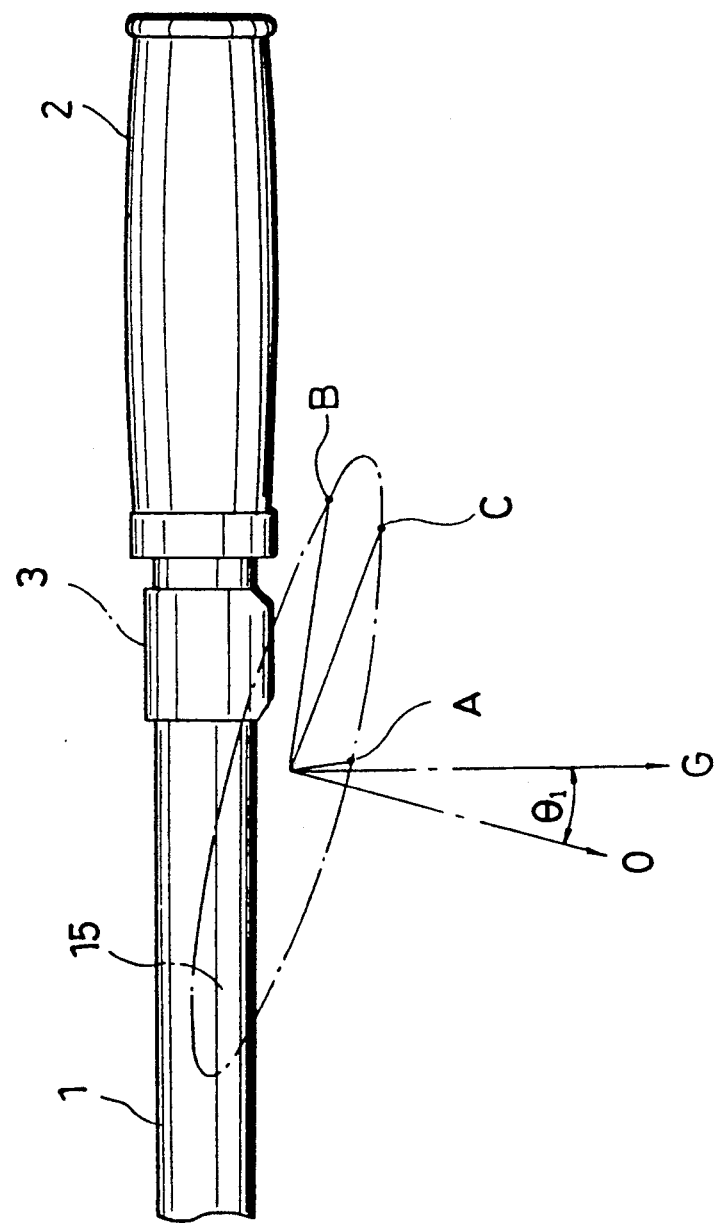
Figure 6:
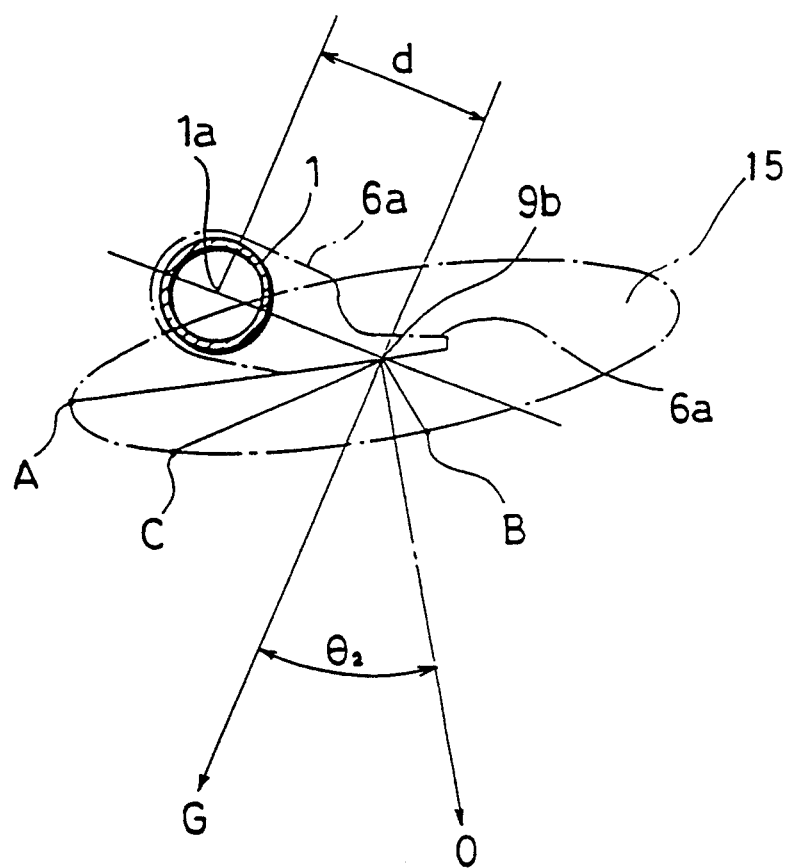

Description is made below with respect to the movement of the control arm 8 about the thus inclined lever shaft 9. FIGS. 4-6 schematically show the pivotal conditions of the control arm 8. FIG. 4 is a plan view, whereas FIG. 5 is a schematic view showing the movement of the control arm 8 as seen in the arrow X direction in FIG. 4. FIG. 6 is a schematic view showing the movement of the control arm 8 as seen in the arrow Y direction in FIG. 4. In these drawings, the pivotal path of the crotch 8c between the respective arm portions 13, 14 of the control arm 8 is shown for representing the pivotal path of the control arm 8 itself.

As shown in these drawings, the control arm 8 pivots in a plane which is inclined relative to the forward extension 6b of the mounting bracket 6a. Due to this inclination, relative to the horizontal plane, of the pivotal plane 15 for the control arm 8, the pivotal path of the control arm 8 is ellipsoidal with a high degree of oblateness when seen from behind (in the arrow X direction) and laterally inward (in the arrow Y direction), as shown in FIGS. 5 and 6.

According to the first embodiment, the control arm 8 is designed to pivot in an angular range of about 90° between a pivotal position A in which the control arm 8 is directed rearwardly and another pivotal position B in which the control arm 8 is directed laterally outward. In this angular range, the position of the control arm 8 varies relative to the handlebar 1 both horizontally and vertically when the control arm 8 is pivotally operated. Specifically, since the lever shaft 9 of the control arm 8 is inclined as above, the vertical position of the control arm 8 becomes lowest when the control arm 8 assumes a position C in which it is obliquely directed outwardly rearward, as shown in FIGS. 5 and 6. On the other hand, when the control arm 8 assumes the rearwardly directed position A and the outwardly directed position B, the control arm 8 is located above the lowest position C. Thus, the control arm 8 becomes vertically closest to the handlebar 2 or grip portion 2 at the two terminal positions in the pivotal range of the control arm.

As a result, the control arm 8 comes near the thumb or forefinger gripping the grip portion 2 at the two terminal positions A, B where it is difficult to pivotally operate the control arm 8 by these fingers, thereby improving the operability. Further, at an intermediate portion where it is easier to pivotally operate the control arm 8 by the thumb or forefinger, the control arm 8 pivotally moves under and away from the handlebar 1 or grip portion 2 with less likelihood of interfering with the fingers gripping the grip portion 2, so that the operability of the control arm 8 is additionally improved.

With the arrangement described above, the first arm portion 13 is mainly operated by the rider's thumb 16 extended inwardly, whereas the second arm portion 14 is pivotally operated by the thumb 16 or forefinger 17 extended downwardly. Therefore, the operational pushing positions for the control arm 8 need not be fixed, and the rider can conveniently operate the control arm 8 by selecting a suitable operating position depending on the pivotal position and the pivotal direction. As a result, the movable ranges of the thumb 16 and forefinger 17 can be effectively utilized for improvement of the operability as well as for enlargement in pivotal range of the control arm 8.

Further, with the speed change lever assembly according the first embodiment, speed change operation can be performed while holding the grip portion 2 between the thumb 16 and the forefinger 17, so that the running safety is greatly improved.

The present invention is not limited to the specific embodiment described above.

Figure 7:
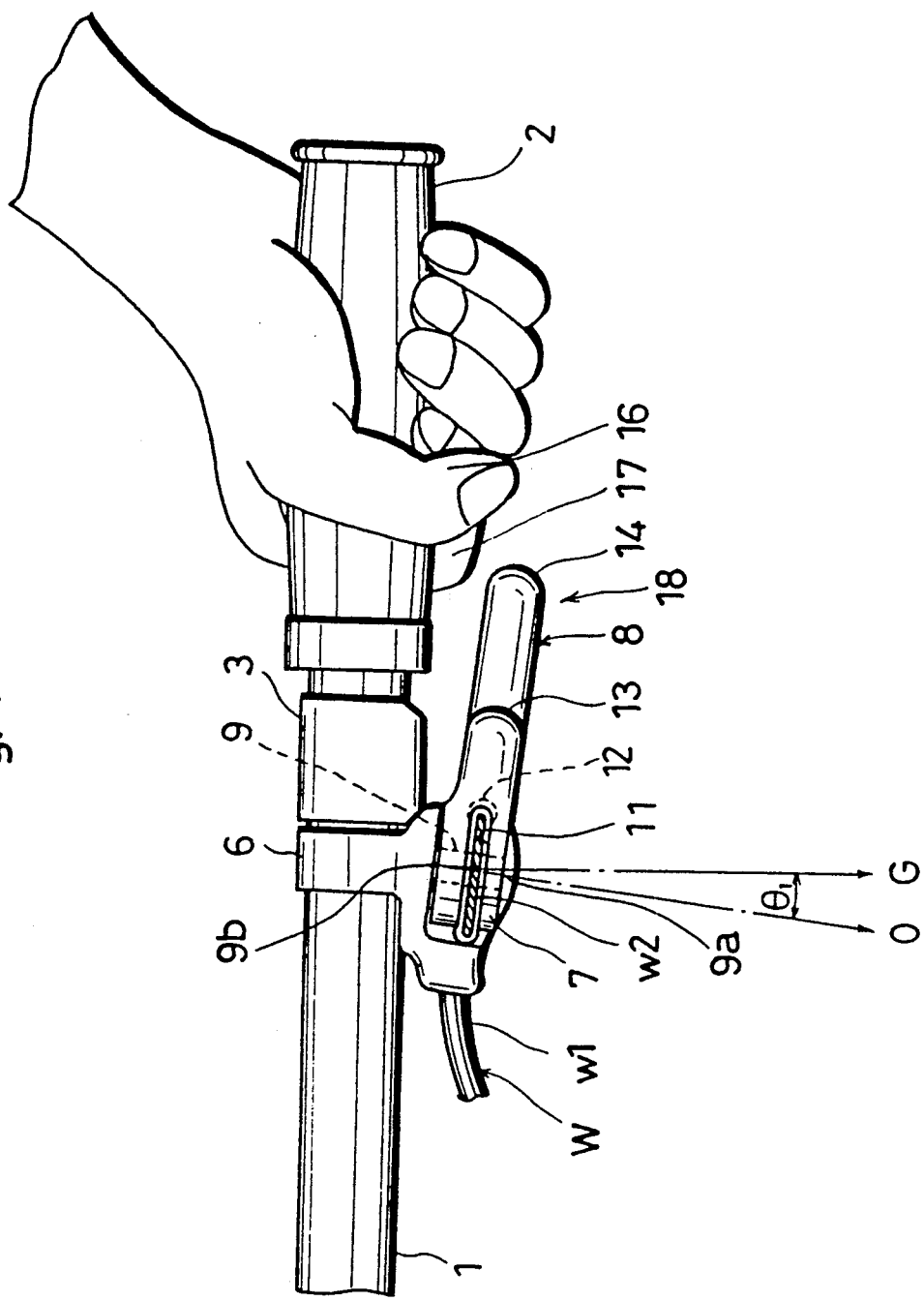
FIG. 7 shows a second embodiment of the present invention and corresponds to FIG. 2 showing the first embodiment.

In the above embodiment, the control arm 8 is bifurcated into a Y-form to have a first operating arm portion 13 which provides a pivotal path located immediately under the handlebar 1 or grip portion 2, and a second operating arm portion 14 which provides a pivotal path spaced from the underside of the handlebar 1 or grip portion 2 by a predetermined distance. However, as shown in FIG. 7 representing a second embodiment, the first and second arm portions 13, 14 may be made to provide their respective pivotal paths in the same plane with similar advantages.

Further, in the illustrated embodiments, the first and second arm portions 13, 14 are identical in length. However, the first arm portion 13 may be rendered shorter than the second arm portion 14, so that the first arm portion 13 pivots inwardly relative to the thumb 16 gripping the grip portion 2 without interfering with the thumb 16. In this case, the pivotal range of the control arm 8 is additionally enlarged to increase the number of speed stages.

Further, the control arm 8 of the illustrated embodiments is branched in a Y-form to have first and second arm portions 13, 14. However, the control arm 8 may be made to have a single arm portion.

Further, in the illustrated embodiments, the lever shaft 9 of the speed change lever assembly is provided on the mounting bracket 6a arranged separately from the brake bracket 3. However, the lever shaft 9 of the speed change lever assembly may be provided integrally on the brake bracket 3 itself.

Further, the shape, length and etc. of the control arm 8 may be modified.

Further, the inclination angle of the lever shaft 9 of the control arm 8 is not limited to that shown for the illustrated embodiments but may be altered depending on the shape, length and etc. of the control arm 8.

Moreover, the pivotal range of the control arm 8 is not limited to that shown for the specific embodiments.

I claim:

1. The combination of a bicycle handlebar having two end grip portions and a speed change lever assembly, the lever assembly comprising:

a mounting bracket attached to the handlebar adjacent to an end grip portion thereof;

a lever shaft extending downwardly from the mounting bracket; and a lever pivotally supported on the lever shaft, the lever including a tubular body rotatably fitted on the lever shaft, the lever further including a control arm extending radially outwardly from the tubular body;

wherein the mounting bracket has a forward extension located in front of the handlebar, the lever shaft being mounted on the forward extension of the mounting bracket to be positioned in front of the handlebar without horizontally overlapping the handlebar; and pivots about the lever shaft in a plane which is non-parallel with respect to the axis of the adjacent end grip portion of the handlebar.

2. The combination according to claim 1, wherein the lever shaft is inclined in a manner such that the control arm has a pivotal path which becomes farthest from the handlebar immediately thereunder but vertically approaches the handlebar when the control arm is pivoted to forward and rearward limit positions.

3. The combination according to claim 1, wherein the control arm is bifurcated into a first arm portion and a second arm portion integral with the first arm portion.

4. The combination according to claim 1, wherein the control arm has a pivotal path which overlaps the end grip portion under the handlebar.

5. The combination according to claim 1, further comprising a brake lever and a brake bracket supporting the brake lever, the brake bracket attached to the handle bar and extending radially away from the handle bar in a first predetermined direction wherein the mounting bracket extends away from the handlebar in a second predetermined direction which deviates from the first predetermined direction by less than 90°.

6. The combination according to claim 1, wherein the lever shaft extends along an axis which does not intersect the handlebar.

7. The combination of a bicycle handlebar having two end grip portions and a speed change lever assembly, the lever assembly comprising:
 a mounting bracket attached to the handlebar adjacent to an end grip portion thereof;
 a lever shaft extending downwardly from the mounting bracket; and
 a lever pivotally supported on the lever shaft, the lever including a tubular body rotatably fitted on the lever shaft, the lever further including a control arm extending radially outward from the tubular body;
 pivots about the lever shaft in a plane which is non-parallel with respect to the axis of the adjacent end grip portion of the handlebar.

* * * * *